United States Patent
Horie

(10) Patent No.: US 10,917,538 B2
(45) Date of Patent: Feb. 9, 2021

(54) INFORMATION PROCESSING APPARATUS AND NON-TRANSITORY COMPUTER READABLE STORAGE MEDIUM STORING INFORMATION PROCESSING PROGRAM

(71) Applicant: FUJI XEROX CO., LTD., Tokyo (JP)

(72) Inventor: Daigo Horie, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 163 days.

(21) Appl. No.: 15/995,869

(22) Filed: Jun. 1, 2018

(65) Prior Publication Data
US 2018/0367695 A1   Dec. 20, 2018

(30) Foreign Application Priority Data
Jun. 16, 2017   (JP) .................... 2017-118603

(51) Int. Cl.
   *G06K 9/00*    (2006.01)
   *H04N 1/32*    (2006.01)
   *G06T 7/136*   (2017.01)
   *G06T 7/11*    (2017.01)

(52) U.S. Cl.
   CPC .......... *H04N 1/32128* (2013.01); *G06T 7/11* (2017.01); *G06T 7/136* (2017.01); *G06T 2207/10008* (2013.01); *G06T 2207/10024* (2013.01); *G06T 2207/20021* (2013.01)

(58) Field of Classification Search
   CPC . G06T 2207/10008; G06T 2207/10024; G06T 2207/20021; G06T 7/11; G06T 7/136; H04N 1/32128; G06F 16/5846; G06F 16/5866; G06F 21/6245; G06K 2209/01; G06K 9/00469; G06K 9/18
   See application file for complete search history.

(56) References Cited

U.S. PATENT DOCUMENTS

| | | | | |
|---|---|---|---|---|
| 4,677,585 A | * | 6/1987 | Ikegami | G06F 40/174 715/236 |
| 7,982,902 B2 | * | 7/2011 | Nitta | H04N 1/3875 358/1.16 |
| 8,290,218 B2 | * | 10/2012 | Okamoto | H04N 1/00872 382/115 |
| 8,873,853 B2 | * | 10/2014 | Rodriguez | G06F 16/58 382/173 |
| 10,140,294 B2 | * | 11/2018 | Millefiorini | G06Q 10/10 |
| 2005/0168763 A1 | * | 8/2005 | Higuchi | H04N 1/00453 358/1.13 |
| 2007/0147658 A1 | * | 6/2007 | Chiba | G06F 16/58 382/100 |
| 2015/0379300 A1 | * | 12/2015 | Terada | G06F 21/6245 726/28 |

(Continued)

FOREIGN PATENT DOCUMENTS

JP      3944775 B2      7/2007

*Primary Examiner* — Ian L Lemieux
(74) *Attorney, Agent, or Firm* — Oliff PLC

(57) ABSTRACT

An information processing apparatus includes a dividing unit configured to divide a read image into plural divided images, an acquiring unit configured to acquire additional information including a content common to the plural divided images, and an addition processing unit configured to perform addition processing for adding the acquired additional information to plural data files respectively including the divided images.

10 Claims, 4 Drawing Sheets

(56) References Cited

U.S. PATENT DOCUMENTS

2016/0171298 A1* 6/2016 Takeda ............... G06F 16/5866
                                                    382/176
2017/0046668 A1* 2/2017 Rowley ................ G06Q 20/36
2017/0061225 A1* 3/2017 Mitchell ............... G06K 9/186
2020/0042786 A1* 2/2020 Matsumae ............ G06K 9/342

* cited by examiner

INFORMATION PROCESSING APPARATUS AND NON-TRANSITORY COMPUTER READABLE STORAGE MEDIUM STORING INFORMATION PROCESSING PROGRAM

CROSS-REFERENCE TO RELATED APPLICATIONS

This application is based on and claims priority under 35 USC 119 from Japanese Patent Application No. 2017-118603 filed Jun. 16, 2017.

BACKGROUND

Technical Field

The present invention relates to an information processing apparatus and a non-transitory computer readable storage medium storing an information processing program.

SUMMARY

According to an aspect of the invention, there is provided an information processing apparatus including a dividing unit configured to divide a read image into plural divided images, an acquiring unit configured to acquire additional information including a content common to the plural divided images, and an addition processing unit configured to perform addition processing for adding the acquired additional information to plural data files respectively including the divided images.

BRIEF DESCRIPTION OF THE DRAWINGS

An exemplary embodiment of the present invention will be described in detail based on the following figures, wherein.

DETAILED DESCRIPTION

An exemplary embodiment of the present invention is described.
<Configuration>

Figure 1:
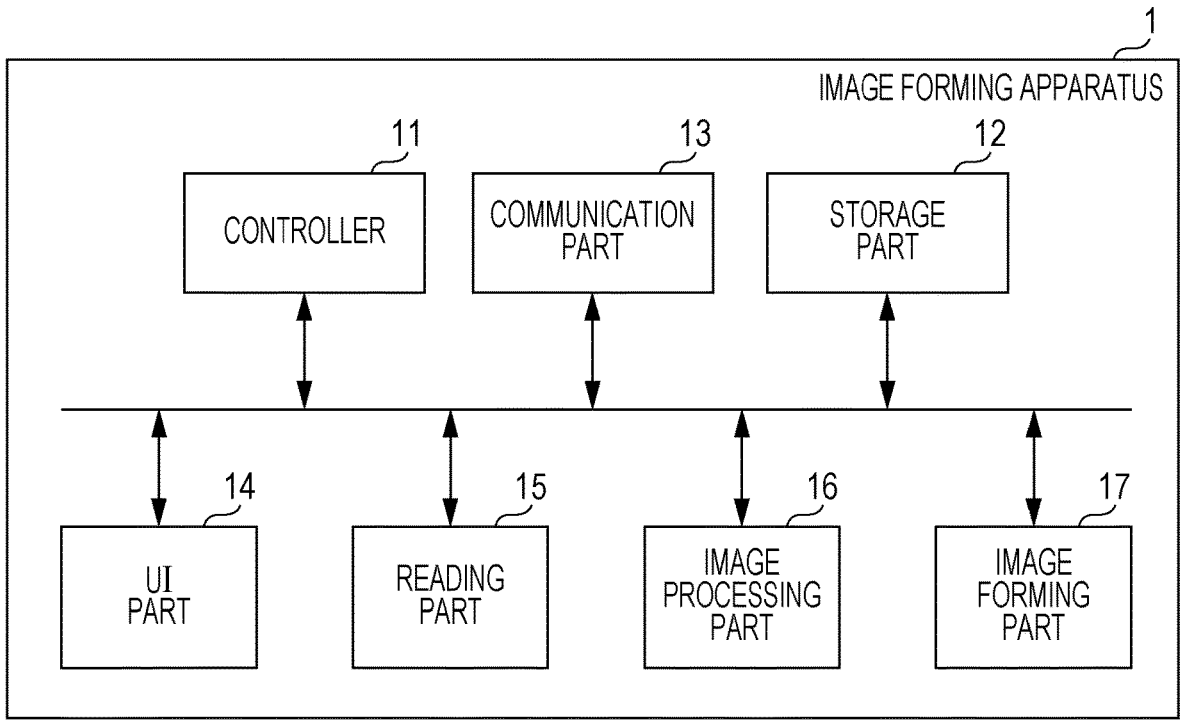
FIG. 1 illustrates a hardware configuration of an image forming apparatus.

FIG. 1 illustrates a hardware configuration of an image forming apparatus 1 according to this exemplary embodiment. The image forming apparatus 1 is an example of an information processing apparatus according to the present invention. The image forming apparatus 1 includes a controller 11, a storage part 12, a communication part 13, a user interface (UI) part 14, a reading part 15, an image processing part 16, and an image forming part 17.

The controller 11 includes a processor such as a central processing unit (CPU) and memories such as a read only memory (ROM) and a random access memory (RAM). The controller 11 performs overall control on the image forming apparatus 1, which includes display control as described later. The ROM stores firmware that describes startup procedures for hardware and an operating system (OS). The RAM is used for storing data when the CPU executes computation. The storage part 12 includes, for example, a semiconductor memory or a hard disk drive. The storage part 12 stores the OS and software (programs) for implementing various functions. The communication part 13 includes a communication interface (I/F) for communications with external electronic devices. The communication part 13 is connected to communication lines such as a local area network (LAN).

The UI part 14 includes a display section and an operation section. The display section includes, for example, a liquid crystal display. The display section displays, on its display surface, a screen to be used by a user for operating the image forming apparatus 1. The operation section includes, for example, a touch panel provided so as to cover the display surface of the display section, and keys provided at a position adjacent to the display surface. The operation section receives an operation performed by the user and outputs a signal to the controller 11 in accordance with the operation. The controller 11 controls the image forming apparatus 1 in accordance with details of the operation.

The reading part 15 optically reads an original document to generate image data. The reading part 16 is, for example, an image scanner including a platen glass, a light source, an optical system, a color filter, and an imaging element. The light source radiates light onto an object placed on the platen glass and the light reflected by the object enters the imaging element via the optical system and the color filter. The imaging element converts the incident light into an image signal and outputs the image signal to the image processing part 16. The image processing part 16 performs image processing such as screening and color conversion on the image signal output from the reading part 15. The image forming part 17 forms, for example, an image on paper that is a recording medium based on the data subjected to the image processing performed by the image processing part 16. The image forming system is, for example, an electrophotographic system or an ink jet system.

Figure 2:
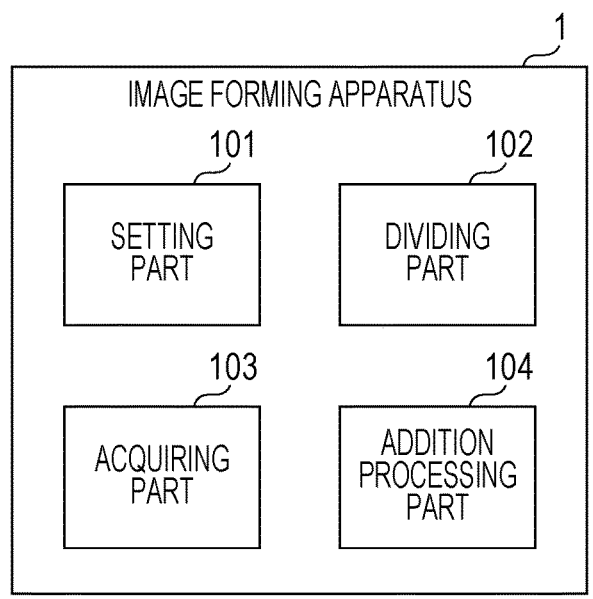
FIG. 2 is a block diagram illustrating a functional configuration of the image forming apparatus.

FIG. 2 is a block diagram illustrating a functional configuration of the image forming apparatus 1. Those functions are implemented in such a manner that the controller 11 executes a program stored in the storage part 12. A setting part 101 sets whether to enable addition processing or not in accordance with, for example, an operation performed by the user. When the addition processing is enabled, the addition processing is performed. When the addition processing is disabled, the addition processing is not performed.

A dividing part 102 divides an image read by the reading part 15 into plural divided images. The read image is, for example, an image obtained by arranging plural business cards, license cards, credit cards, cash cards, or ID cards (these objects are hereinafter referred to as business cards or the like) on the platen glass of the reading part 15 and reading contents written on the business cards or the like. The divided image is an image showing each of the business cards or the like arranged on the platen glass. That is, the read image includes plural business cards or the like and the divided image includes a single business card or the like alone.

An acquiring part 103 acquires additional information including contents common to the plural divided images. In this exemplary embodiment, the acquiring part 103 acquires the additional information by generating the additional information. For example, the acquiring part 103 generates the additional information in accordance with an operation performed by the user.

An addition processing part 104 performs the addition processing in accordance with the setting performed by the setting part 101. Specifically, the addition processing part 104 adds the additional information acquired by the acquiring part 103 to plural data files respectively including the divided images in formats compatible with the formats of the data files.

<Operation>

Figure 3:
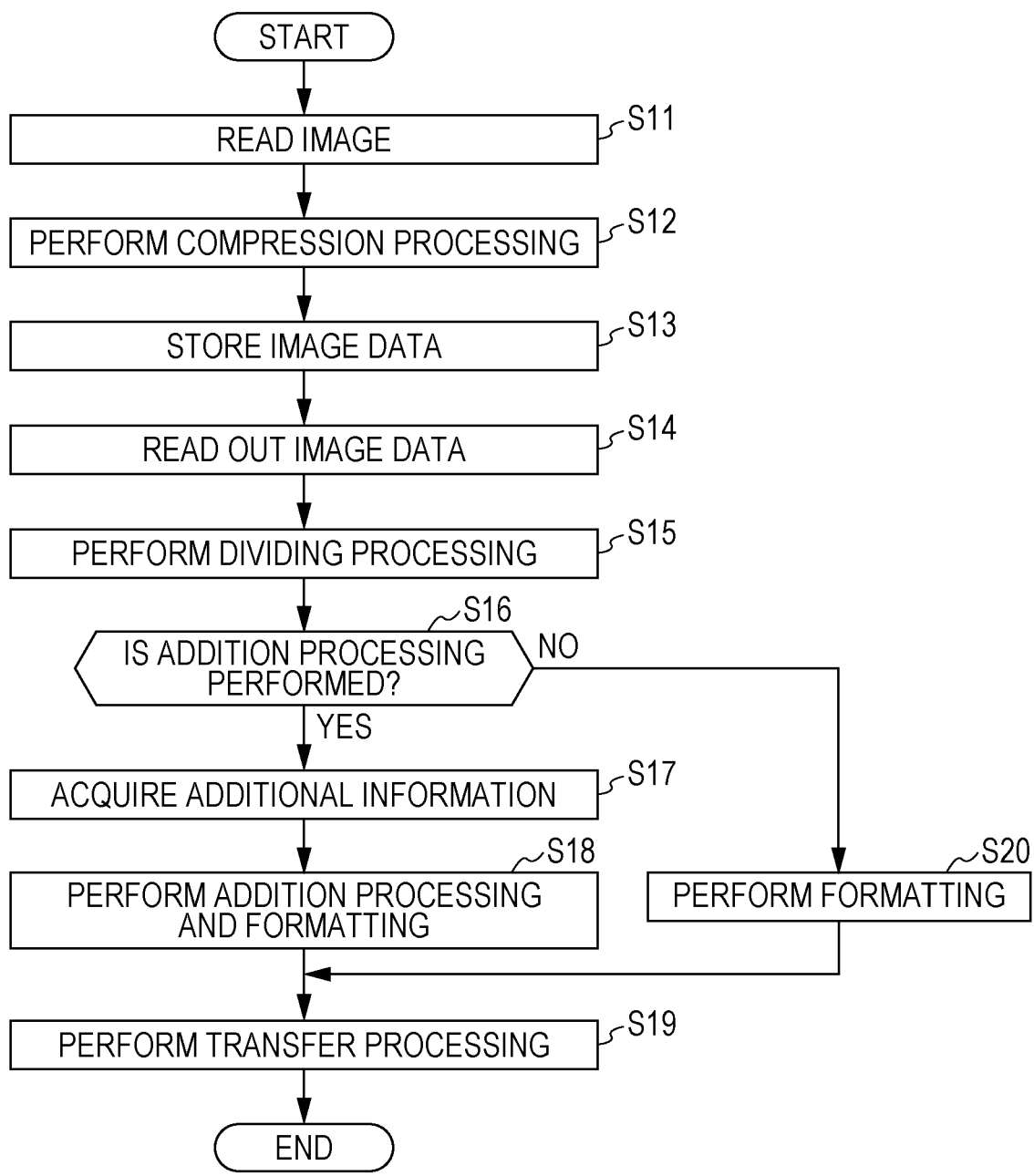
FIG. 3 is a flowchart illustrating an operation of the image forming apparatus.
Figure 4A:
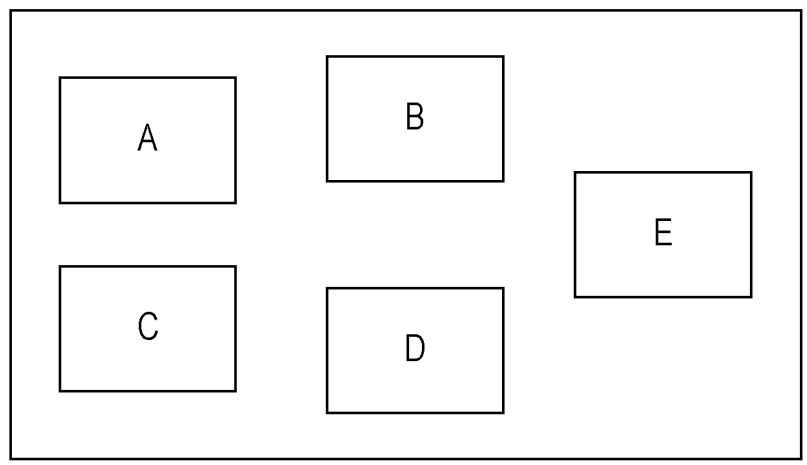
FIGS. 4A to 4C are schematic diagrams illustrating changes of image data.

Next, an operation of the image forming apparatus 1 is described. Processing of FIG. 3 is executed every time the reading part 15 reads an image. For example, the user places five business cards on the platen glass and instructs image reading. In response to the instruction, the reading part 15 reads the business cards by scanning at a time to generate read image data (Step S11). Through this operation, the reading part 15 generates read image data indicating a read image including five business cards A to E as illustrated in, for example, FIG. 4A.

The image processing part 16 performs predetermined image processing on the read image data and compresses the read image data in a predetermined compression format such as the Joint Photographic Experts Group (JPEG) format (Step S12). The read image data is stored in the storage part 12 (Step S13).

Figure 4B:
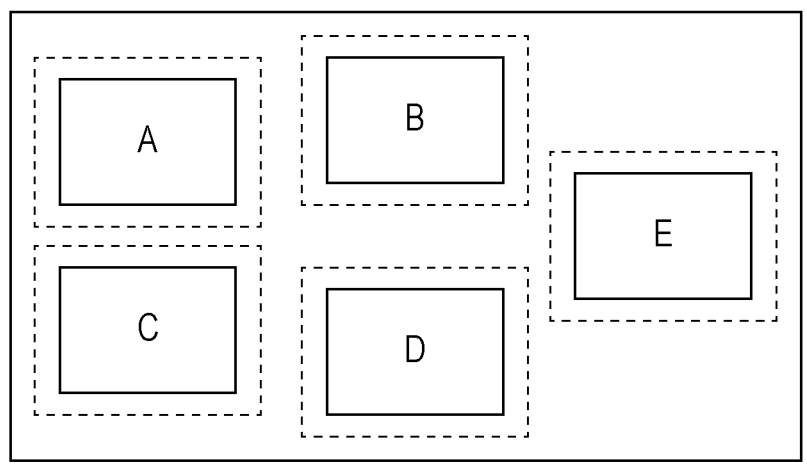

Next, the dividing part 102 reads out the read image data from the storage part 12 (Step S14) and divides the read image data into plural divided images (Step S15). Specifically, the dividing part 102 analyzes the read image data, extracts rectangular images that fall within a predetermined size range intended for a business card and within a predetermined color range, and divides the read image data into pieces of divided image data indicating the respective rectangular images. Through this operation, the dividing part 102 generates the five business cards A to E as different pieces of divided image data as illustrated in, for example, FIG. 4B.

Next, the addition processing part 104 determines whether to perform the addition processing or not based on the setting performed by the setting part 101 as to whether to enable the addition processing or not (Step S16). When the addition processing is performed (Step S16; YES), the acquiring part 103 acquires additional information including contents common to the plural divided images (Step S17). Specifically, the acquiring part 103 prompts the user to input additional information and, in response to the input operation, generates additional information including contents input by the user on the UI part 14 (for example, a date, the name of a conference attended by the members written on the business cards, or the department and name of the user who inputs comments).

Figure 4C:
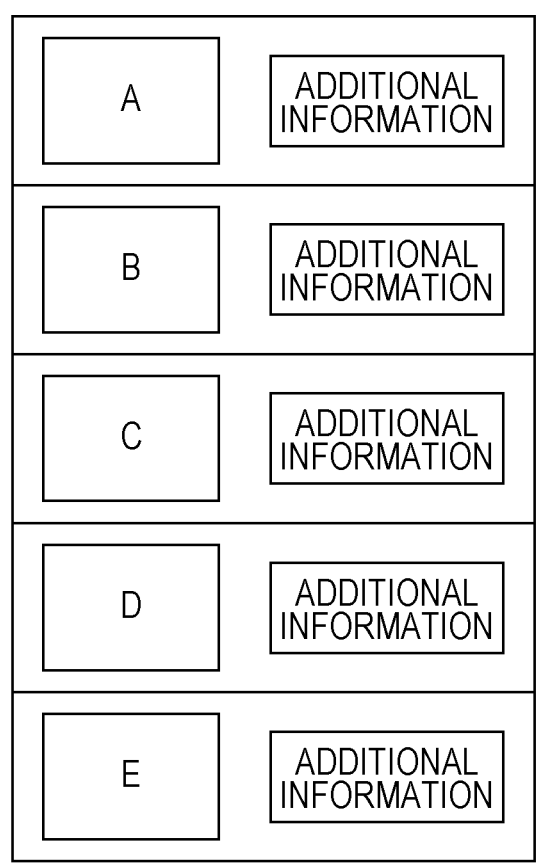

The addition processing part 104 performs the addition processing for adding the additional information acquired by the acquiring part 103 to each piece of divided image data and also performs formatting (Step S18). The format to be used in this case is, for example, a portable document format (PDF), XDW (extension of DocuWorks documents), or a tag image file format (TIFF). The additional information is described in description formats compatible with the respective formats. Through this operation, the addition processing part 104 generates five data files individually associated with the additional information common to the divided images of the business cards A to E as illustrated in, for example, FIG. 4C. The data files including the divided images and the additional information are transferred to, for example, a terminal used by the user (Step S19). When the addition processing is not performed (Step S16; NO), the read image data is formatted (Step S20) and is transferred to, for example, the terminal used by the user (Step S19).

<Modified Examples>

The exemplary embodiment may be modified as follows. Further, plural modified examples may be combined together.

<1>

The acquiring part 103 acquires the additional information by generating the additional information in accordance with an operation performed by the user. The acquiring part 103 may generate the additional information by other methods.

The acquiring part 103 may generate the additional information based on information stored in the image forming apparatus 1. For example, when the image forming apparatus 1 stores a current date and time or attributes such as the name of the user who has logged into the image forming apparatus 1, the acquiring part 103 generates additional information including those pieces of information.

The acquiring part 103 may generate the additional information based on an image common to the divided images. For example, when the acquiring part 103 performs character recognition such as optical character recognition/reader (OCR) on the business cards or the like and the name of a company or department common to all of the business cards or the like is recognized as a result of the character recognition, the acquiring part 103 may generate additional information including those pieces of information.

<2>

In the exemplary embodiment, the addition processing part 104 adds the additional information to divided images obtained by dividing a read image generated by reading processing that is performed once. The addition processing part 104 may add the additional information to divided images obtained by dividing a read image generated by reading processing that is performed plural times specified by the user. The user specifies the number of times for the image reading processing on the image forming apparatus 1 and the addition processing part 104 adds the additional information to divided images obtained by dividing a read image generated by the reading processing that is performed the number of times specified by the user.

The addition processing part 104 may add additional information including contents common to divided images including a common image among the divided images obtained by dividing a read image generated by the reading processing that is performed one or plural times. For example, when the acquiring part 103 performs character recognition such as optical character recognition/reader (OCR) on the business cards or the like and the name of a company or department common to some of the business cards or the like is recognized as a result of the character recognition, the acquiring part 103 generates additional information including those pieces of information. The addition processing part 104 adds the additional information including the contents common to the divided images including the common image among the divided images obtained by dividing the read image generated by the reading processing that is performed one or plural times.

<3>

The type and number of pieces of additional information are not limited to the type and number that are exemplified in the exemplary embodiment.

<4>

The exemplary embodiment described above is directed to the example in which the controller 11 implements the functions described above by executing the program. The functions may be implemented by a hardware circuit. The program may be provided by being recorded in a computer readable recording medium such as an optical recording medium or a semiconductor memory and the program may be read from the recording medium and installed in the information processing apparatus. The program may be provided via a telecommunication line.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
   a processor programmed to:
   receive an image with a plurality of documents arranged in the image;
   divide the received image into a plurality of divided images, each divided image of the plurality of divided images including one document of the plurality of documents;
   acquire additional information including a content common to each document in the plurality of divided images, the additional information being user input that identifies the content that is common; and
   perform addition processing for adding the acquired additional information to a plurality of data files respectively including the divided images.

2. The information processing apparatus according to claim 1, wherein the processor is programmed to set whether to enable the addition processing or not, and
   the processor is programmed to perform the addition processing in accordance with the setting.

3. The information processing apparatus according to claim 1, wherein the processor is programmed to generate the additional information, and the processor is programmed to add the generated additional information.

4. The information processing apparatus according to claim 3, wherein the processor is programmed to generate the additional information based on information stored in the information processing apparatus.

5. The information processing apparatus according to claim 3, wherein the processor is programmed to generate the additional information based on an image common to the divided images.

6. The information processing apparatus according to claim 1, wherein the processor is programmed to add additional information including a content common to divided images obtained by dividing a read image generated by reading processing that is performed once.

7. The information processing apparatus according to claim 1, wherein the processor is programmed to add additional information including a content common to divided images obtained by dividing a read image generated by reading processing that is performed a plurality of times specified by a user.

8. The information processing apparatus according to claim 1, wherein the processor is programmed to add additional information including a content common to divided images including a common image among divided images obtained by dividing a read image generated by reading processing that is performed one or a plurality of times.

9. A non-transitory computer readable storage medium storing an information processing program that, when executed, causes a computer to perform steps of:
   receiving an image with a plurality of documents arranged in the image;
   dividing the received image into a plurality of divided images, each divided image of the plurality of divided images including one document of the plurality of documents;
   acquiring additional information including a content common to each document in the plurality of divided images, the additional information being user input that identifies the content that is common; and
   addition processing for adding the acquired additional information to a plurality of data files respectively including the divided images.

10. An information processing apparatus, comprising:
    a receiving means for receiving an image with a plurality of documents arranged in the image;
    a dividing means for dividing the received image into a plurality of divided images, each divided image of the plurality of divided images including one document of the plurality of documents;
    an acquiring means for acquiring additional information including a content common to each document in the plurality of divided images, the additional information being user input that identifies the content that is common; and
    an addition processing means for performing addition processing for adding the acquired additional information to a plurality of data files respectively including the divided images.

* * * * *